Dec. 11, 1956 E. J. BATORSKI 2,773,428
HOBBING MACHINE
Filed July 10, 1953 4 Sheets-Sheet 1

INVENTOR.
BY Edward J. Batorski
Hudson Boughton
Williams, David & Hoffmann
ATTORNEYS Dec. 11, 1956 E. J. BATORSKI 2,773,428
HOBBING MACHINE
Filed July 10, 1953 4 Sheets-Sheet 2

INVENTOR.
EDWARD J. BATORSKI
By Hudson, Boughton,
Williams, David & Hoffmann
ATTORNEYS Dec. 11, 1956     E. J. BATORSKI     2,773,428
HOBBING MACHINE Filed July 10, 1953     4 Sheets-Sheet 4

INVENTOR.
EDWARD J. BATORSKI
BY Hudson, Daughton,
Williams, David & Hoffmann
ATTORNEYS

United States Patent Office 2,773,428
Patented Dec. 11, 1956

2,773,428

HOBBING MACHINE

Edward J. Batorski, Chagrin Falls, Ohio, assignor to The Cleveland Hobbing Machine Company, Euclid, Ohio, a corporation of Ohio Application July 10, 1953, Serial No. 367,183

7 Claims. (Cl. 90—4)

The present invention relates to machine tools and more particularly to machines employing the hobbing principle for cutting and finishing both spur and helical gears, splined shafts, and the like.

The principal objects of the present invention is the provision of a new and improved machine tool and particularly a machine of the hobbing type for cutting and finishing gears, splined shafts, and the like, which machine has a novel, simple and easily adjustable means for changing the timing of the rotation of the work and tool spindles, thereby enabling the machine to be quickly set up to cut either helical or spur gears, splines, or the like.

Another object of the present invention is the provision of a new and improved machine which operates on the hobbing principle for cutting and finishing spur or helical gears, shafts, or the like, having a tool spindle and a work spindle rotated in timed relation and means for effecting relative movement therebetween, which machine is also provided with adjustable means for introducing into the timed rotation of the spindles a component dependent on the relative feed movement therebetween, which component may be changed or varied without changing the gearing of the machine.

A further object of the present invention is the provision of a novel and improved machine tool which operates on the hobbing principle and comprises a tool spindle and a work spindle rotated in timed relation, the machine being so constructed and arranged that it may be used to cut or grind both spur and helical gears, splines, and the like, without changing the gearing in the machine.

Another object of the present invention is the provision of a new and improved machine tool having a first rotatable member, gear means for imposing a first rotational component on the member to rotate it in timed relation to a second rotatable member, and novel means for imposing a second rotational component on the first member in response to, and dependent on, relative movement between two elements, the novel means being so constructed and arranged that the second rotational component may be altered or changed without changing any gearing.

The present invention resides in certain novel details of construction, combinations and arrangements of parts, and further objects and advantages of the invention will be apparent to those skilled in the art to which the invention relates from the further description of the preferred embodiment thereof described with reference to the accompanying drawings forming a part of this specification in which similar reference characters designate corresponding parts and in which.

Figure 1:
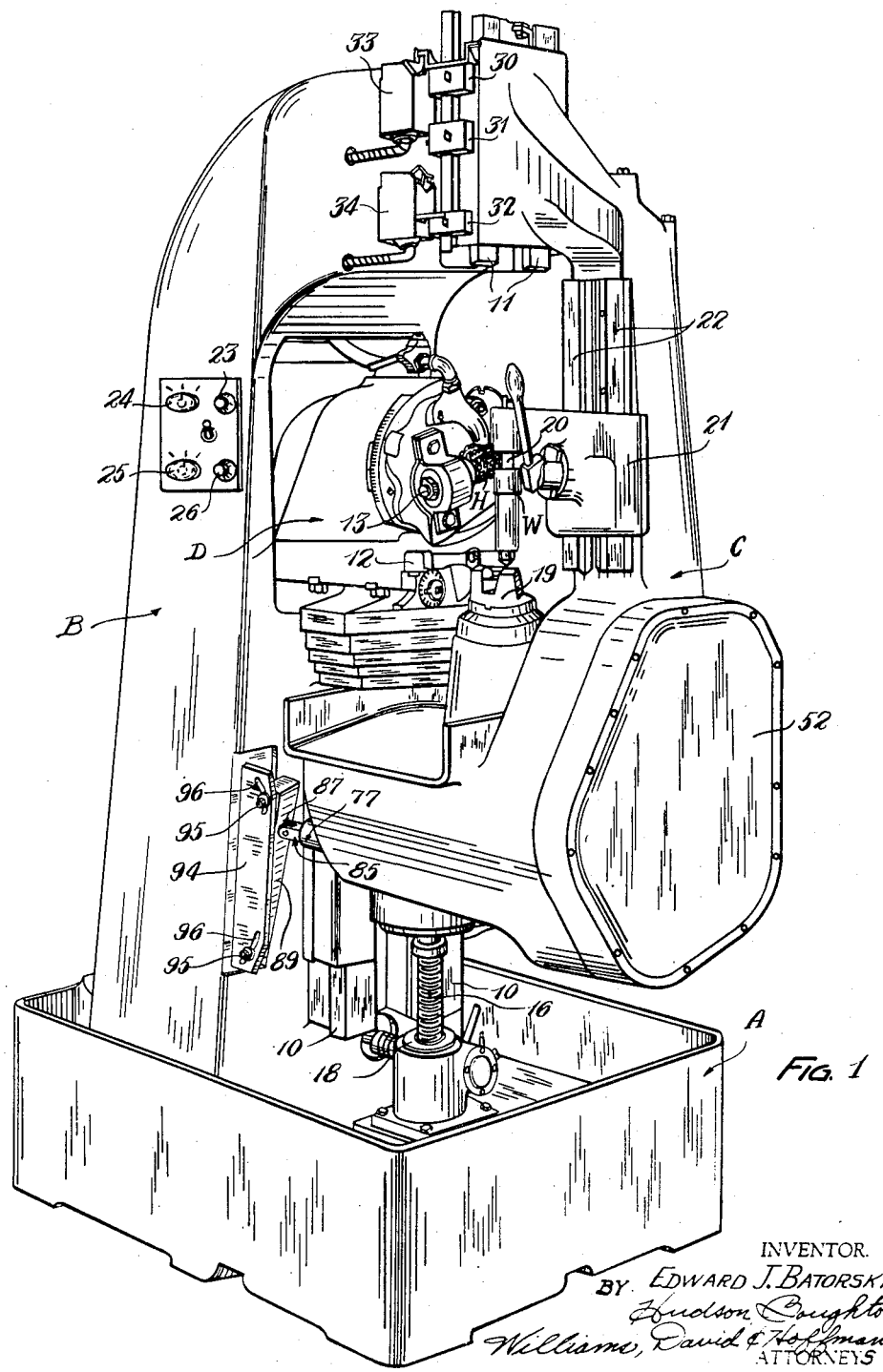
Fig. 1 is a perspective view of a hobbing machine embodying the present invention.
Figure 2:
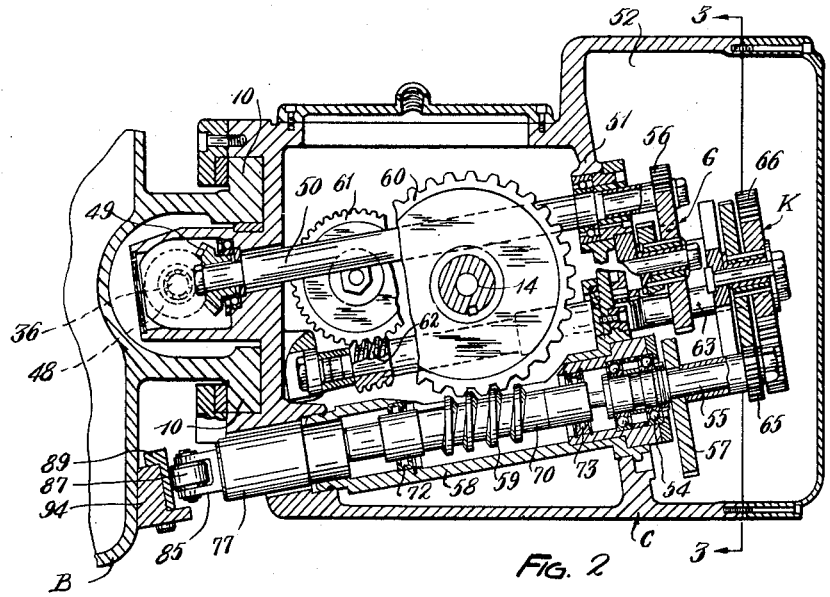
Fig. 2 is a fragmentary horizontal sectional view taken through the workhead of the machine of Fig. 1.
Figure 3:
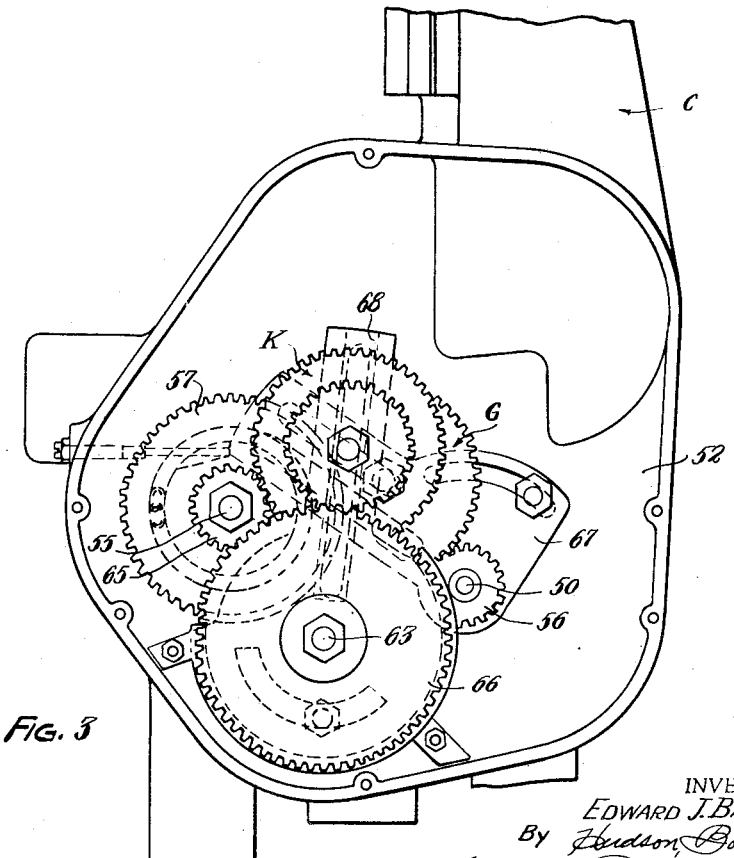
Fig. 3 is a view taken in the direction of the arrows approximately along line 3—3 of Fig. 2.
Figure 4:
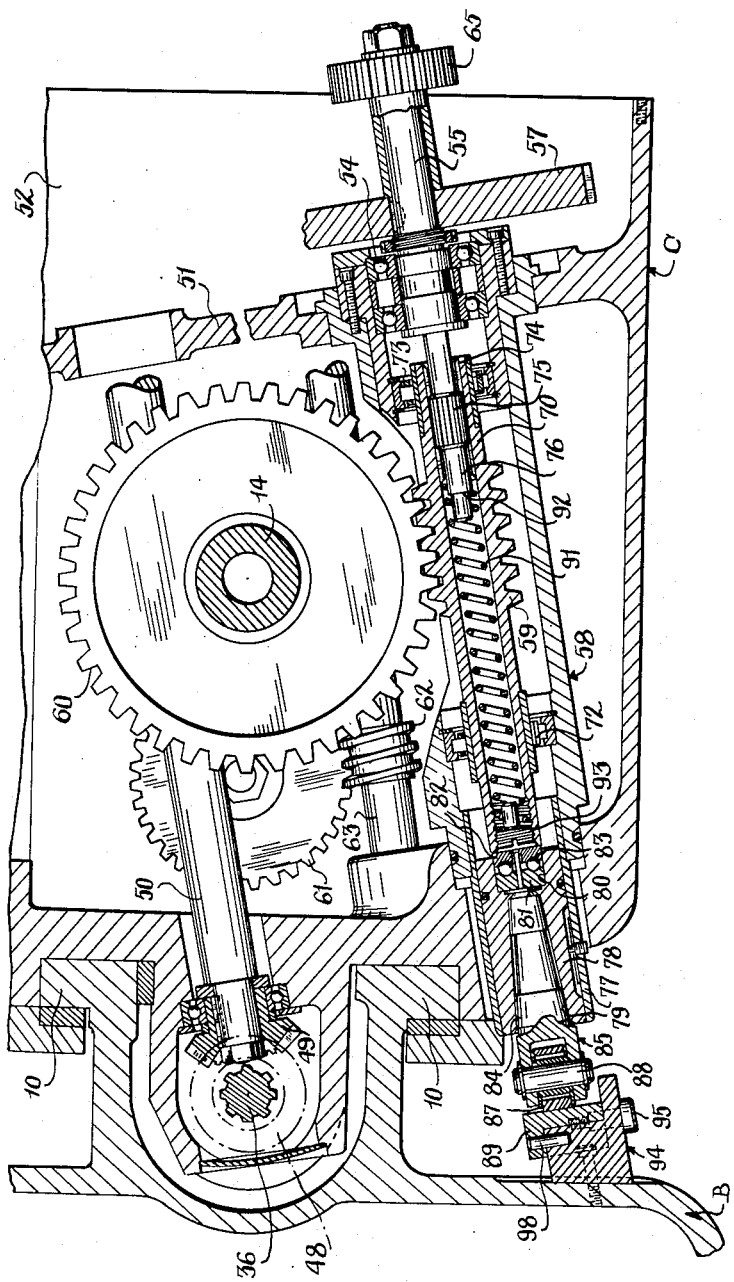
Fig. 4 is an enlarged fragmentary sectional view of the workhead showing the details of the means for imposing a rotational movement on the spindle which is dependent on the rate of relative feed movement between the workhead and the hob arbor.
Figure 5:
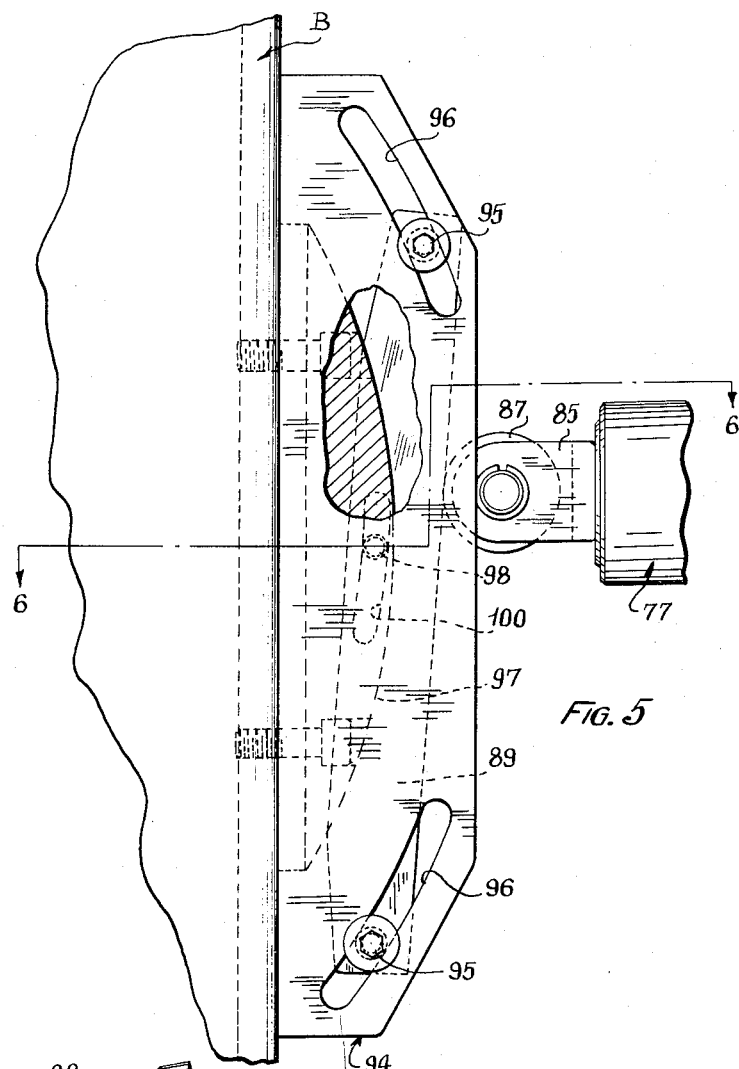
Fig. 5 is a detached elevational view of the sine bar which determines the amount of lead or helix angle introduced in the gear being cut, taken on line 5—5 of Fig. 6.
Figure 6:
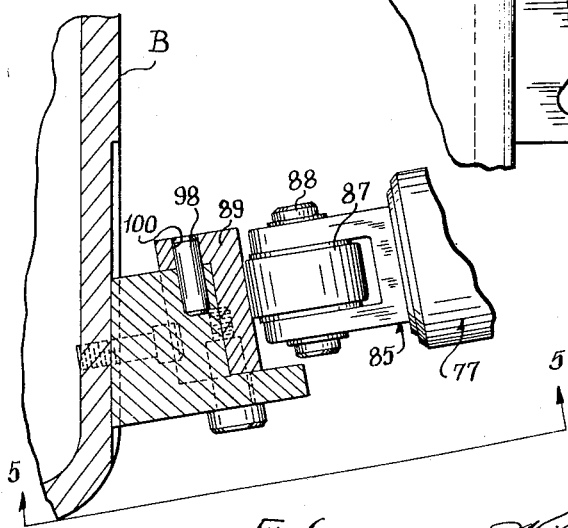
Fig. 6 is a cross-sectional view taken in the direction of the arrows approximately along line 6—6 of Fig. 5.

Although the invention is susceptible of use in various types of machine tools it is particularly suitable for use in machines employing the hobbing principle for cutting or grinding spur or helical gears, shafts, splines and the like, and is especially useful in the type of hobbing machine having a so-called "shifting hob head" as it provides a means for compensating for the hob shift, thereby permitting great flexibility in the range of shift rates employed. For purposes of illustration, the invention is herein shown and described as embodied in a hobbing machine having a shifting hob head, which machine is similar to that shown in U. S. Patent No. 2,307,428, issued January 5, 1943, and the patent referred to therein.

Generally speaking, the machine shown in the drawings comprises a frame or frame element including a base A having a two-part vertical column B fixed thereto, a machine tool element or workhead C slidably supported on spaced vertical ways 10 and 11 on the column B, and a second machine tool element or hob head D adjustably supported on horizontal ways 12 intermediate the ways 10 and 11. The tool and work spindles 13 and 14, respectively, are geared together and driven from a reversible electric motor within the column B, hereinafter referred to as the cut motor. A relative feed movement between the spindles is effected by moving the workhead C vertically through the medium of a lead screw 16 geared to the spindle drive. Means in the form of a high speed reversible electric motor within the column B and operatively connected to a nut 18 with which the lead screw 16 cooperates is provided for rapidly elevating or lowering the workhead C, as the case may be, to quickly bring the work blank W up to or down to the hob H and/or to return the workhead to its starting position after the cutting operation is completed and the finished piece removed. The hob H may be of the abrasive type for grinding or of the metallic type for cutting, depending on the particular type of hobbing operation to be performed. In the embodiment shown, the work W is adapted to be supported between a suitable chuck 19 fixed to the upper end of the work spindle 14 and a center 20 carried by a tailstock 21 slidably supported on vertical ways 22 on the workhead C.

The control circuits for the respective motors, and the cycle of operations of the machine are preferably similar to those disclosed in the aforesaid patent and will not be herein described in detail. Suffice it to say that after a suitable blank has been positioned in the workhead C, the start push button switch 23 is depressed, whereupon the traverse motor is operated to move the workhead vertically at a rapid traverse rate to bring the blank to cutting position with respect to the hob. At this point in the cycle, the traverse motor is automatically stopped and the cut motor started, thus continuing the movement of the workhead but at a relatively slow feed rate. The feed movement continues until the blank is cut, whereupon the cut motor is automatically stopped. After the work has been removed from the workhead, the workhead is returned to its original position by again depressing the start push button switch to actuate the traverse motor in the opposite direction. The direction in which the cycle of operations is performed depends upon the setting of the selector controller switches 24, 25. The machine can be stopped at any time during its cycle of operations by depressing the stop push button switch 26. The length of travel of the rapid traverse approach movement, the feed movement, etc., is controlled by the adjustable stops 30, 31 and 32, carried by the workhead C and adapted to actuate limit switches 33 and 34.

The work spindle 14 is rotated in timed relation to the hob arbor 13 by the cut motor within the column B. The cut motor is operatively connected to a vertical spline shaft 36 supported in the column B and extending into the workhead C as is shown in detail in the aforesaid patent. A bevel gear 48 on the spline shaft 36 is continuously in mesh with a gear 49 fixed to the rear end of a horizontal shaft 50 which projects forwardly through a partition 51 in the workhead C and into a gear box or compartment designated generally by the reference character 52. The shaft 50 is operatively connected to a horizontal shaft 55 through the medium of the work spindle drive change gears G, the driving and driven gears 56 and 57 of which are keyed to the ends of the shafts 50 and 55, respectively. The shaft 55 is rotatably supported by roller bearings 54 in an adjustable cradle 58 and is operatively connected, in a manner more particularly described hereinafter, to a worm 59 continuously in mesh with a worm wheel 60 keyed to the work spindle 14.

The workhead C is moved past the tool spindle during the cutting operation by the lead screw 16 previously referred to. The lead screw 16 is adapted to be rotated from the work spindle drive by a worm wheel 61 keyed to the upper end of the screw, which worm wheel is continuously in mesh with a worm 62 fixed to a horizontal shaft 63 suitably supported in the workhead C. The shaft 63, like the shafts 50 and 55, projects through the partition 51 and into the gear box 52 where it is operatively connected to the shaft 55 by the feed change gears K, the driving and driven gears 65 and 66, respectively, of which are fixed to the shafts 55 and 63, respectively.

It will be apparent from the foregoing, that the direction of feed with respect to the direction of rotation of the tool and work spindles can be reversed by either inserting or removing an idler gear in the feed change gears K and that the direction of feed and the direction of rotation of the work spindle 14 can be reversed with reference to the direction of rotation of the tool or hob spindle 13 by inserting or removing an idler gear from the work spindle drive change gears G. For the purposes of permitting the use of various change gears, idlers, etc., in the work spindle drive change gears G and the feed change gears K, suitable spiders or gear supporting members 67 and 68 are provided. The particular arrangement shown in the present instance forms no part of this invention and may be similar to that disclosed in the aforesaid Patent No. 2,307,428.

According to the provisions of the present invention, the worm 59 is supported so that it may move axially while in mesh with worm wheel 60. In the illustrated embodiment, the worm 59 is part of a hollow shaft 70 supported for axial movement in cradle 58 by two spaced bearings 72, 73. The forward end of the shaft 70 is provided with an internal spline 74 which meshes with an external spline 75 on a reduced portion 76 at the rearward end of the shaft 55. Rotation of the shaft 55 imparts a rotational movement to the worm wheel 60 through the spline and the worm 59 on shaft 70.

The rearward end of the cradle 58 supports a sleeve 77 which is coaxial with the shaft 70 and extends rearwardly from the housing of the workhead C. Mounted within the sleeve 77 is a cylindrical member 78 which has an axial tapered bore 79 communicating with a counterbore 80 opening into the interior of the cradle 58. A thrust bearing comprising a fixed race 81 and a movable race 82, separated by roller bearings 83, is mounted in the counterbore 80 and abuts the end of the shaft 70. The tapered bore 79 is adapted to receive the tapered shank 84 of a forked member 85 which rotatably supports a roller 87 on a shaft 88. The roller 87 is adapted to abut a cam member or sine bar 89 fixed to the forward side of column B.

The roller 87 is yieldably urged into engagement with the sine bar 89 by a spring 91 located within the shaft 70, the spring also acting to bias the shaft 70 in a rearward direction with respect to the workhead C. The forward end of the spring 91 abuts a rearwardly facing shoulder 92 on the reduced portion 76 of the shaft 55. The other end of the spring abuts a threaded closure 93 for the shaft 70 which acts as an adjustable spring retainer. The sine bar 89 is adjustably secured to a bracket 94 on the column B by bolts 95 which pass through elongated arcuate slots 96 in the bracket to allow the sine bar to be adjusted to various angles with respect to the line of movement of the workhead C. Bracket 94 is provided with an arcuate center portion 97 which mounts a pin 98 adapted to operate in a slot 100 in a flange depending from the sine bar 89.

It is now apparent that if the sine bar 89 is set at an angle with respect to the line of movement of the workhead C, the roller 87 will follow the sine bar and the worm 70 will move axially as the work is fed past the hob. This axial movement will impose a rotational component on the worm wheel 60 which is independent of the rotational component imposed by the rotation of the shaft 55, but is dependent on the movement of the workhead. The component or factor introduced is easily varied by merely changing the angle of the sine bar with respect to the line of movement of the workhead. If the timing or change gears of the machine are set so that the work spindle 14 and the tool arbor 13 rotate in the timed relation necessary to produce a spur gear, the component to vary the timed relation in accordance with the feed, so that a lead or helix angle is produced in the gear being cut, may be obtained by setting the sine bar at the proper angle. The component will be introduced only in response to the feed movement and, therefore, the feed in this case need not be timed. Inasmuch as the lead or helix angle produced in the gear being cut can be varied by merely adjusting the sine bar to vary its angle with respects to the line of movement of the workhead, the necessity of changing gears to provide or change the helix angle or lead of the gear has been eliminated.

The invention may also be used as a compensation or corrective factor with or without a timed feed. Oftentimes in setting up a machine to cut a spur or helical gear, it is found that the gear ratios necessary require gears having other than a whole number of teeth. In such a situation, a close approximation can be made with the gears and a correction applied with the use of the sine bar. A timed feed is necessary unless the change gears are such that the hob spindle and the work arbor rotate in the relation necessary to produce a spur gear. As another illustration, the invention may be used to compensate for the shift of a shifting hob head, that is, a machine in which the hob is continuously moved axially at a slow shift rate during the cutting operation, thus enabling the operator to use the optimum shift rate for each particular set-up which would be impractical if he had to refigure the gearing and make the necessary gear changes. Errors due to heat treatment of the gears can also be readily compensated for. Attention is further called to the fact that all of these corrections, compensations etc., can be made without affecting the cycle time of the machine, an important practical consideration.

While the preferred embodiment of the invention has been described in considerable detail, it is to be understood that the invention is not limited to the particular construction shown and described and it is my intention to hereby cover all adaptations, modifications and uses thereof coming within the practice of those skilled in the art to which the invention relates and the spirit and scope of the appended claims.

Having thus described my invention, I claim:

1. In a hobbing machine, a frame, a workhead movable with respect to said frame comprising a rotatable work spindle and a gear train for rotating said spindle, said gear train including a worm wheel and a worm gear in mesh therewith, an axially movable shaft for supporting said worm gear for axial movement while in mesh with said worm wheel, said shaft being rotatably supported in said workhead and extending outwardly therefrom, means for rotating said shaft, a cam mounted on said frame, a cam follower fixed to the outward end of said shaft and cooperating with said cam to impart axial movement to said shaft, and means yieldably urging said shaft axially toward said cam.

2. In a hobbing machine, a frame, a workhead movable with respect to said frame comprising a rotatable work spindle and means for rotating said spindle, said means comprising a worm wheel and a worm gear in mesh therewith, an axially movable hollow shaft for supporting said worm gear for axial movement while in mesh with said worm wheel, said shaft being rotatably supported in said workhead and extending outwardly therefrom, means for rotating said shaft, a sine bar mounted on said frame, a sine bar follower fixed to the outward end of said shaft cooperating with said sine bar to impart axial movement to said shaft on movement of said workhead, and spring means within said shaft for yieldably urging said shaft axially toward said sine bar.

3. In a hobbing machine, tool and work spindles, a frame member, a machine tool member, means rotatably supporting one of said spindles in said frame member, means rotatably supporting the other of said spindles in said machine tool member, means for movably supporting said machine tool member on said frame member for linear movement in a direction generally parallel to the axis of rotation of said work spindle, power actuated means for rotating said tool and work spindles in predetermined timed relation comprising gearing interconnecting said spindles and including a worm supported for movement in a direction generally parallel to its axis of rotation and in mesh with a worm wheel, power actuated means for moving said machine tool member in said direction generally axially of the axis of rotation of said work spindle, and means comprising an adjustable cam operatively connected to one of said members and a cooperating cam follower operatively connected to the other of said members for moving said worm axially of its axis of rotation in predetermined relation to the movement of said machine tool member.

4. In a hobbing machine, tool and work spindles, a frame member, a machine tool member, means rotatably supporting one of said spindles in said frame member, means rotatably supporting the other of said spindles in said machine tool member, means for movably supporting said machine tool member on said frame member for linear movement in a direction generally parallel to the axis of rotation of said work spindle, power actuated means for rotating said tool and work spindles in predetermined timed relation comprising gearing interconnecting said spindles and including a worm supported for movement in a direction generally parallel to its axis of rotation and in mesh with a worm wheel, power actuated means for moving said machine tool member in said direction generally axially of the axis of rotation of said work spindle, and means comprising an adjustable sine bar operatively connected to one of said members and a follower operatively connected to the other of said members and in engagement with said sine bar for moving said worm axially of its axis of rotation in predetermined relation to the movement of said machine tool member.

5. In a hobbing machine, tool and work spindles, a frame member, a machine tool member, means rotatably supporting said tool spindle in said frame member, means rotatably supporting said work spindle in said machine tool member, means for movably supporting said machine tool member on said frame member for linear movement in a direction generally parallel to the axis of rotation of said work spindle, power actuated means for rotating said tool and work spindles in predetermined timed relation comprising gearing interconnecting said spindles and including a worm supported in said machine tool member for movement in a direction generally parallel to its axis of rotation and in mesh with a worm wheel, power actuated means for moving said machine tool member in said direction generally axially of the axis of rotation of said work spindle, and means comprising an adjustable cam operatively connected to one of said members and a cooperating cam follower operatively connected to the other of said members for moving said worm axially of its axis of rotation in predetermined relation to the movement of said machine tool member.

6. In a hobbing machine, tool and work spindles, a frame member, a machine tool member, means rotatably supporting said tool spindle in said frame member, means rotatably supporting said work spindle in said machine tool member, means for movably supporting said machine tool member on said frame member for linear movement in a direction generally parallel to the axis of rotation of said work spindle, power actuated means for rotating said tool and work spindles in predetermined timed relation comprising gearing interconnecting said spindles and including a worm supported in said machine tool member for movement in a direction generally parallel to its axis of rotation and in mesh with a worm wheel, power actuated means for moving said machine tool member in said direction generally axially of the axis of rotation of said work spindle, and means comprising a cam adjustably connected to said frame member and a cooperating cam follower operatively connected to said machine tool member for moving said worm axially of its axis of rotation in predetermined relation to the movement of said machine tool member.

7. In a hobbing machine, tool and work spindles, a frame member, a machine tool member, means rotatably supporting said tool spindle in said frame member, means rotatably supporting said work spindle in said machine tool member, means for movably supporting said machine tool member on said frame member for linear movement in a direction generally parallel to the axis of rotation of said work spindle, power actuated means for rotating said tool and work spindles in predetermined timed relation comprising gearing interconnecting said spindles and including a worm supported in said machine tool member for movement in a direction generally parallel to its axis of rotation and in mesh with a worm wheel, power actuated means for moving said machine tool member in said direction generally axially of the axis of rotation of said work spindle, and means comprising an adjustable sine bar operatively connected to said frame member and a cooperating follower operatively connected to said machine tool member for moving said worm axially of its axis of rotation in predetermined relation to the movement of said machine tool member.

References Cited in the file of this patent

UNITED STATES PATENTS

| | | |
|---|---|---|
| 1,049,350 | Fawcus | Jan. 7, 1913 |
| 1,879,196 | Greene | Sept. 27, 1932 |
| 2,006,750 | Shlesinger | July 2, 1935 |
| 2,232,704 | Hughes | Feb. 25, 1941 |
| 2,315,068 | Matthews | Mar. 30, 1943 |
| 2,321,102 | Pelphrey | June 8, 1943 |
| 2,342,232 | Wildhaber | Feb. 22, 1944 |
| 2,348,845 | Pelphrey | May 16, 1944 |
| 2,528,242 | Praeg | Oct. 31, 1950 |